(12) United States Patent  (10) Patent No.: US 7,445,723 B2
Lee et al.  (45) Date of Patent: Nov. 4, 2008

(54) OPTICAL SCANNER AND METHOD OF FABRICATING THE SAME

(75) Inventors: Jin-ho Lee, Suwon (KR); Young-chul Ko, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/652,694

(22) Filed: Jan. 12, 2007

(65) Prior Publication Data

US 2007/0108548 A1 May 17, 2007

Related U.S. Application Data

(62) Division of application No. 10/226,176, filed on Aug. 23, 2002, now Pat. No. 7,180,647.

(30) Foreign Application Priority Data

Aug. 24, 2001 (KR) ............................ 2001-0051407

(51) Int. Cl.
 *B29D 11/00* (2006.01)
(52) U.S. Cl. ..................... 216/24; 216/67; 359/290; 359/291; 359/295
(58) Field of Classification Search ............ 216/24; 359/295

See application file for complete search history.

(56) References Cited

U.S. PATENT DOCUMENTS 5,025,346 A 6/1991 Tang et al.

(Continued)

FOREIGN PATENT DOCUMENTS

EP 0 849 574 A2 6/1998

(Continued)

*Primary Examiner*—Shamim Ahmed
*Assistant Examiner*—Maki Angadi
(74) *Attorney, Agent, or Firm*—Buchanan Ingersoll & Rooney PC

(57) ABSTRACT

An optical scanner and a fabricating method thereof are provided. The optical scanner includes a base substrate, a frame, a H-shaped stage, supporters, and a stage driving structure. An interconnection layer having a predetermined pattern is formed on the base substrate. The frame has a rectangular frame shape which is formed on the base substrate. The H-shaped stage has a central area that performs a seesaw motion in the frame with respect to a uniaxial central axis and is positioned on the uniaxial central axis, and four extended areas that extend from two sides of the central area through which the uniaxial central axis passes, parallel the uniaxial central axis. The supporters have support beams that are positioned on the uniaxial central axis and connected to the frame and torsion bars that extend from the support beams and are connected to the central area of the stage. The stage driving structure has moving comb electrodes and fixed comb electrodes beneath the stage and on the base substrate facing the stage, respectively. A plurality of comb electrodes can be formed on the extended areas. Thus, a driving force can greatly be increased, which results in obtaining a similar driving speed using a considerably low voltage. Also, the weight of the stage should greatly be reduced for high-speed driving. For this, the stage is diced into a plurality of stages. Further, to increase the driving force, a plurality of comb electrodes are additionally formed on right and left sides of the stage.

7 Claims, 15 Drawing Sheets

U.S. PATENT DOCUMENTS

| | | |
|---|---|---|
| 5,640,133 A | 6/1997 | MacDonald et al. |
| 5,914,553 A | 6/1999 | Adams et al. |
| 5,959,760 A | 9/1999 | Yamada et al. |
| 5,998,906 A * | 12/1999 | Jerman et al. ............... 310/309 |
| 5,999,306 A * | 12/1999 | Atobe et al. ................ 359/295 |
| 6,256,131 B1 | 7/2001 | Wine et al. |
| 6,636,339 B2 | 10/2003 | Lee |
| 6,690,850 B1 * | 2/2004 | Greywall ..................... 385/18 |
| 6,758,983 B2 | 7/2004 | Conant et al. |
| 6,894,824 B2 | 5/2005 | Guo et al. |

FOREIGN PATENT DOCUMENTS

| | | |
|---|---|---|
| JP | 4-343318 A | 11/1992 |
| JP | 9-159937 A | 6/1997 |
| JP | 11-52278 | 2/1999 |
| JP | 2000-147419 A | 5/2000 |
| KR | 2001-51437 | 6/2001 |

\* cited by examiner

OPTICAL SCANNER AND METHOD OF FABRICATING THE SAME

CROSS-REFERENCE TO RELATED APPLICATIONS

This application is a divisional of prior U.S. application No. 10/226,176 filed on Aug. 23, 2002 and claims priority under 35 U.S.C. § 120 to such prior application, the entire content of which is incorporated herein by reference. This application also claims priority under 35 U.S.C. § 119 to Korean Patent Application No. 2001-0051407, filed on Aug. 24, 2001, in the Korean Intellectual Property Office, the disclosure of which is incorporated herein in its entirety by reference.

BACKGROUND OF THE INVENTION

1. Field of the Invention

The present invention relates to an optical scanner using a micromirror provided by a micro-electro mechanical system (MEMS) and a method of fabricating the same, and more particularly, to an optical scanner for seesaw driving in a uniaxial direction and a method of fabricating the same.

2. Description of the Related Art

U.S. Pat. No. 5,025,346 discloses a micro actuator using an electrostatic effect caused by a comb-type electrode. The micro actuator has moveable comb electrodes and fixed comb electrodes which are alternately disposed in a moveable structure and a stationary structure. The moveable structure is suspended by support structures and driven horizontally by a predetermined resonant frequency.

In such micro actuator, moving comb electrodes are formed parallel to the plane of a moveable stage or the moveable structure. Fixed comb electrodes are opposite to and alternately disposed along with the moving comb electrodes in a stationary state, and are formed parallel to the plane of the moveable stage. The micro actuator is considerably enlarged, compared to the moving stage or the moveable structure since comb electrodes are formed around the moving stage. As a result, applications of the micro actuator are limited.

SUMMARY OF THE INVENTION

To solve the above-described problems, it is a first object of the present invention to provide an optical scanner which can be subminiaturized and driven at a high speed by efficient design structures of comb electrodes, and a method of fabricating the optical scanner.

It is a second object of the present invention to provide an optical scanner which can perform linear high-speed scanning using a low drive voltage, and a method of fabricating the optical scanner.

It is a third object of the present invention to provide an optical scanner which can stably be mass-produced, and a method of fabricating the optical scanner.

Accordingly, to achieve the above objects, there is provided an optical scanner including a base structure, a frame, a H-shaped stage, supporters, and a stage driving structure. An interconnection layer having a predetermined pattern is formed on the base structure. The frame has a rectangular frame shape which is formed on the base substrate. The H-shaped stage has a central area that performs a seesaw motion in the frame with respect to a uniaxial central axis and is positioned on the uniaxial central axis, and four extended areas that extend from two sides of the central area through which the uniaxial central axis passes, parallel the uniaxial central axis. The supporters have support beams that are positioned on the uniaxial central axis and connected to the frame and torsion bars that extend from the support beams and are connected to the central area of the stage. The stage driving structure has moving comb electrodes and fixed comb electrodes beneath the stage and on the base substrate facing the stage, respectively.

It is preferable that the frame includes a second partial frame on the base substrate, a first partial frame on the second partial frame, a bonding layer between the first and second partial frames, and the supporters are combined with the first frame and the stage to form a single body. It is preferable that the moving comb electrodes beneath the extended areas of the stage are interdigitated with the fixed comb electrodes on the base substrate, and the extended areas have comb frameworks to support the moving comb electrodes.

According to a preferred embodiment of the present invention, the fixed comb electrodes that are opposite to the moving comb electrodes beneath the stage include first fixed comb electrodes and second fixed comb electrodes which are electrically insulated from each other.

To achieve the above objects, there is provided another type optical scanner including a base structure, a rectangular frame, a plurality of stages, supporters, and a stage driving structure. An interconnection layer having a predetermined pattern is formed on the base structure. The rectangular frame is formed on the base substrate. The plurality of stages are arrayed in the frame. The supporters suspend the stages from the frame. The stage driving structure has moving comb electrodes and fixed comb electrodes which are formed beneath the stage and on the base substrate opposite to the stage, respectively.

Each of the stages has a H shape and includes a central area that is positioned on a central axis and four extended areas that extend from two sides of the central area through which the central axis passes, parallel to the central axis, and each of the supporters has support beams that are connected to the frame and torsion bars that extends from the support beams and are connected to the central area of the stage.

It is preferable that the frame includes a second partial frame on the base substrate, a first partial frame on the second partial frame, and a bonding layer between the first and second partial frames, and the supporters are combined with the first partial frame and the stage to form a single body. It is preferable that the moving comb electrodes on the extended areas of the stage are interdigitated with the fixed comb electrodes on the base substrate, and the extended areas have comb frameworks to support the moving comb electrodes.

According to a preferred embodiment of the present invention, the fixed comb electrodes that are opposite to the moving comb electrodes beneath the stage include first fixed comb electrodes and second fixed comb electrodes which are electrically insulated from each other.

To achieve the above objects, there is provided a method of fabricating an optical scanner. An upper structure is formed so as to have a rectangular first partial frame, a central area supported by supporters having support beams that are positioned inside separated areas in the first partial frame and extend from the first frame and torsion bars that extend from the support beams, and directly connected to the torsion bars, and a H-shaped stage that extends from the central area, parallel to the torsion bars. A lower structure is formed so as to have a second partial frame opposite to the first partial frame and a substrate that supports the second partial frame and is spaced apart from the stage. The first partial frame is bonded to the second partial frame by eutectic bonding to combine the upper and lower structures into one structure.

It is preferable that a bonding layer for the eutectic bonding is formed on one of the first and second partial frames in one of steps of forming the upper and lower structures. It is preferable that vertical moving comb electrodes are formed beneath the stage in the step of forming the upper structure.

According to a preferred embodiment of the present invention, it is preferable that fixed comb electrode that are opposite to the moving comb electrodes beneath the stage are formed on the substrate in the step of forming the lower structure.

Preferably, when forming the upper structure, a hole larger than the stage is first formed in a first substrate. Next, portions corresponding to the separated areas are etched to predetermined width and depth on a second substrate. The first and second substrates are anodic-bonded. The second substrate is polished to a predetermined thickness. An upper metal layer is formed on a portion corresponding to the first partial frame beneath the second substrate. A lower surface of the second substrate is etched to a predetermined pattern to perforate the portions corresponding to the separated areas and forming the moving comb electrodes having a predetermined height beneath the stage.

Preferably, when forming the lower structure, an interconnection layer having a predetermined pattern is formed on a third substrate which supports the lower structure. Lower separated areas having predetermined width and depth are formed between the second partial frame and the fixed comb electrodes beneath the fourth substrate. The third and fourth substrates are anodic-bonded. A portion corresponding to the second partial frame is etched to a predetermined depth on the fourth substrate. A lower metal layer is formed in the etched portion of the fourth substrate. A mask layer is formed to cover a portion corresponding to the second partial frame and the fixed comb electrodes and expose separated areas between the second partial frame and the fixed comb electrode. A portion that is not covered with the mask layer is etched to a predetermined depth to perforate the lower separated areas and forming fixed comb electrodes having a predetermined height inside the lower separated areas.

Preferably, when forming the upper metal layer, a metal seed layer is formed beneath the first partial frame. The metal seed layer is coated with a eutectic bonding layer.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Hereinafter, preferred embodiments of an optical scanner and a method of fabricating the same according to the present invention will be described with reference to the attached drawings.

Figure 1:
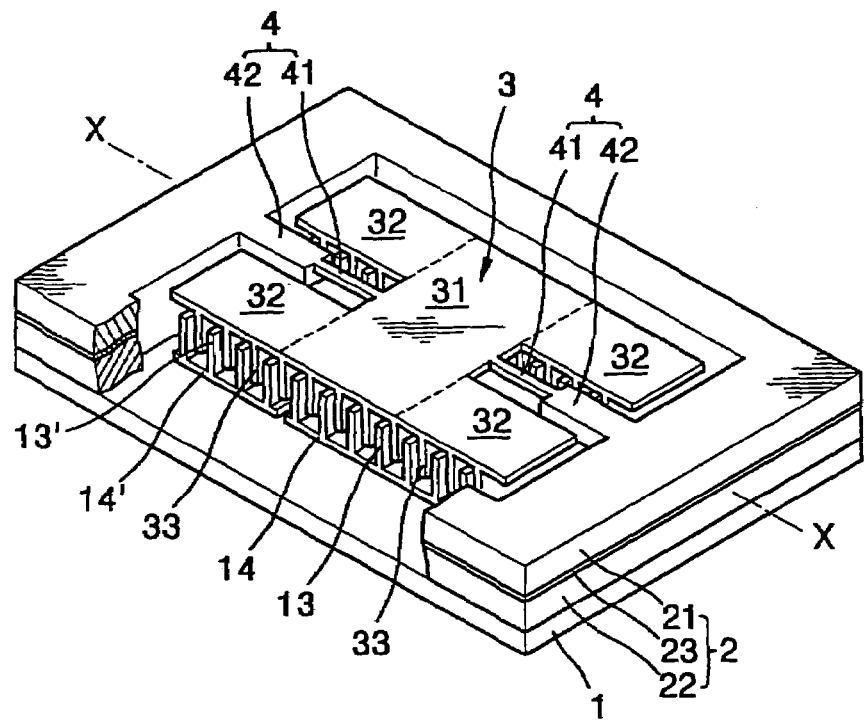
FIG. 1 is a schematic perspective view of a first embodiment of an optical scanner according to the present invention.
Figure 2:
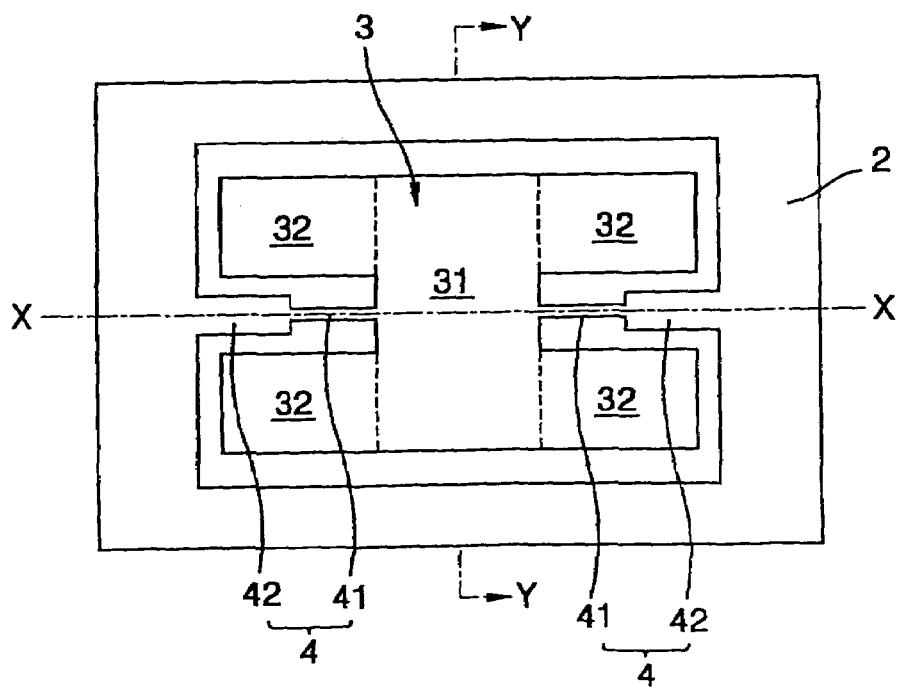
FIG. 2 is a plan view of the optical scanner shown in FIG. 1.
Figure 3:
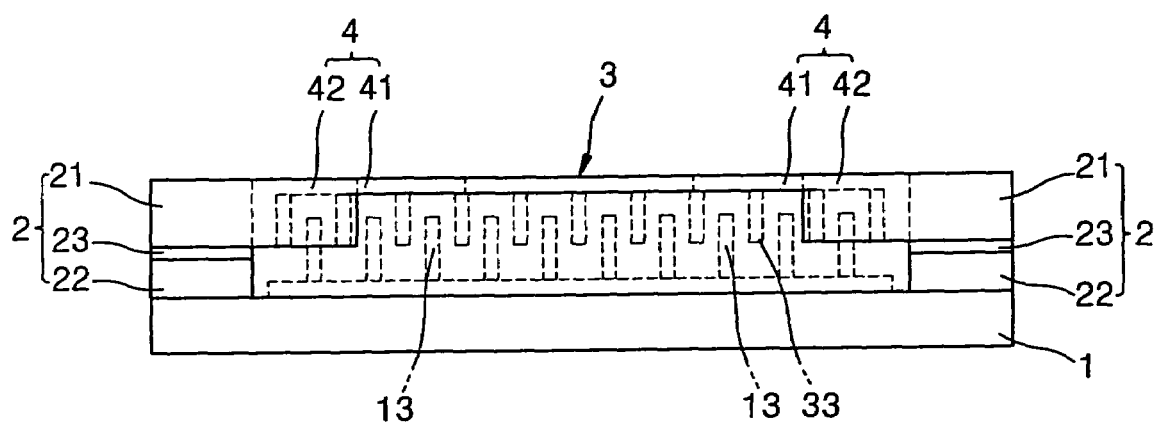
FIG. 3 is a cross-sectional view taken along line X-X of FIG. 2.

A first embodiment of an optical scanner of the present invention will first be described with reference to FIGS. 1 through 3. FIG. 1 is a schematic view of a first embodiment of an optical scanner according to the present invention. FIG. 3 is a cross-sectional view taken along line X-X of FIG. 1, which shows cross-sections of supporters 4 for supporting a stage 3 on which a mirror (not shown) is formed, and of a frame 2. FIG. 2 is a schematic plan view of the optical scanner shown in FIG. 1.

Referring to FIGS. 1 through 3, a rectangular frame 2 is formed on a substrate 1 which is formed of pyrex glass. A H-shaped stage 3 is positioned among separated areas having a predetermined width inside the frame 2. The stage 3 is suspended at a predetermined height from the substrate 1 by two supporters 4 which are positioned on a X-X axis. The stage 3 has a central area 31 that is directly connected to the supporters 4 crossing the separated areas and four extended areas 32 that extend from the central area 31, parallel to the supporters 4 by a predetermined length. The mirror may be formed only on the central area 31. Alternately, the mirror may be formed on the entire surfaces of the central area 31 and the extended areas 32.

The supporters 4 extend from the frame 2 and have stationary support beams 42 and torsion bars 41 that extend from the support beams 42, are connected to the central area 31 of the stage 3, and are transformed by the motion of the stage 3. The torsion bars 41 are connected to central portions of opposite edges of the central area 31 of the stage 3. The frame 2, the supporters 4, and the stage 3 form a single body. The torsion bars 41 support the seesaw motion of the stage 3 and provide proper elastic restoring force during the motion of the stage 3, and the frame 2 and the supporters 4 provide an electric path to the stage 3. The frame 2 includes a first partial frame 21 and a second partial frame 22 which are Respectively positioned on and beneath a eutectic bonding layer 23 made of an AuSn alloy. The first partial frame 21, the stage 3, and the supporters 4 are obtained from one material substrate, e.g., one silicon wafer, through a multi-step process that will be described later. Thus, separated rectangular areas exist between the first partial frame 21 and the stage 3, and the supporters 4 having the torsion bars 41 and the support beams 42 which cross the separated areas. Moving comb electrodes 33 are formed beneath the central area 31 and the extended areas 32 that extend from the central area 31. First fixed comb electrodes 13 are alternately disposed along with the moving comb electrodes 33 on the substrate 1 that faces the central area 31 and the extended areas 32.

As shown in FIG. 1, second fixed comb electrodes 13' are positioned beside the first fixed comb electrodes 13. The second fixed comb electrodes 13' are an optional element in the present invention, which is a kind of sensor for sensing the motion of the stage 3 based on changes in electric capacitance. Additional electrodes such as the second fixed comb electrodes 13' have typically been used, and thus their descriptions are omitted. The first and second fixed comb electrodes 13 and 13' are supported by bases 14 and 14', as shown in FIG. 1. The base 14 and the first fixed comb electrodes 13 form a single body, and the base 14' and the second fixed comb electrodes 13' form a single body. For convenience, the second fixed comb electrodes 13' and the base 14' are not shown in FIG. 3.

Figure 4:
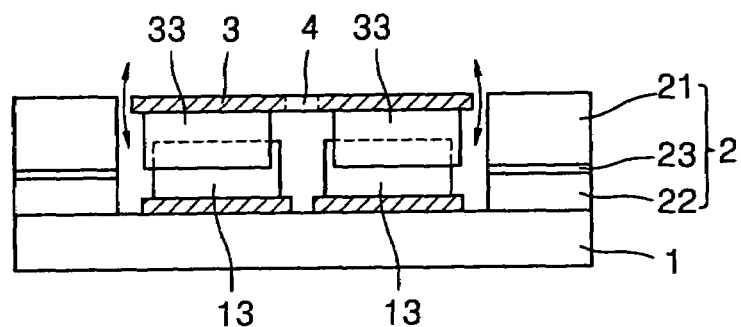
FIG. 4 is a cross-sectional view taken along line Y-Y of FIG. 2.

FIG. 4 is a cross-sectional view taken along line Y-Y of FIG. 2, which shows structures of the moving comb electrodes 33 and the first fixed comb electrodes 13 between the stage 3 and the substrate 1. As shown in FIG. 4, a structure for driving the stage 3 by use of the moving comb electrodes 11 and the first fixed comb electrodes 13 is provided to be symmetrical to a rotation shaft formed by the supports 4.

The characteristic of the optical scanner of the present invention is to have a structure in which the stage 3 includes the central area 31 and extended areas 32 extending from the central area 31, and the supporters 4 for supporting the stage 3 have the support beams 42 and the torsion bars 41 connected to central portions of opposite edges of the stage 3.

The optical scanner of the present invention having the above-described structure can control standards, such as the length and thickness of the supporters 4, regardless of the distance between the stage 3 and the frame 2. In other words, the optical scanner can provide a stage having a sufficient area, comb electrode structures for driving the stage, and supporters for stably supporting the stage.

Figure 5:
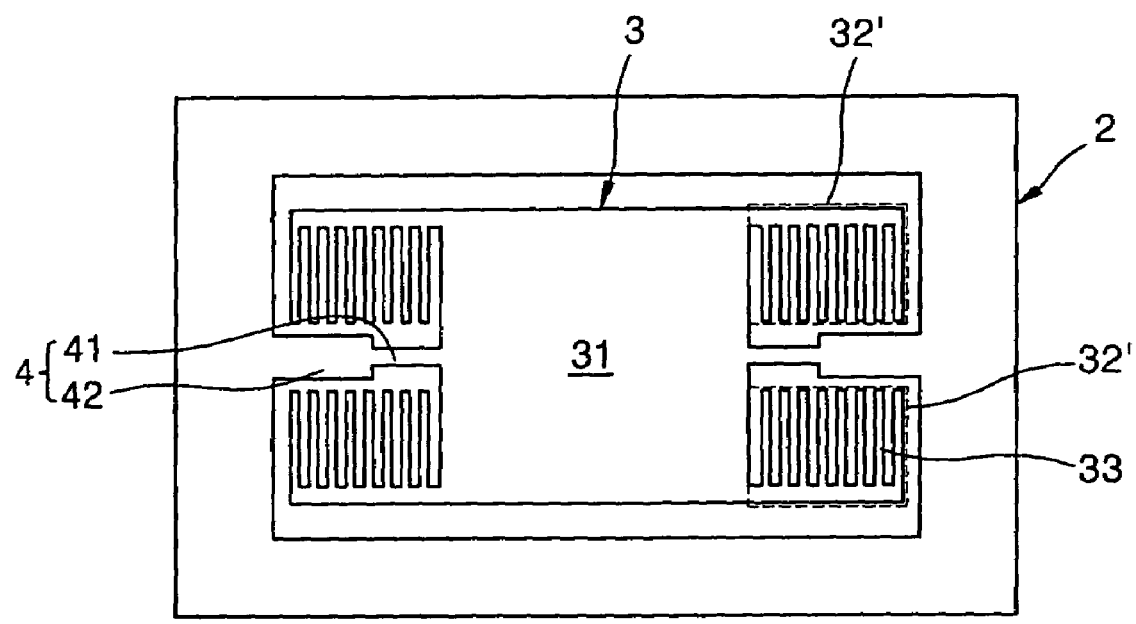
FIG. 5 is a schematic plan view of a structure of a stage in a second embodiment of an optical scanner according to the present invention.

FIG. 5 is a plan view of a second embodiment of the optical scanner in which the extended areas 32 are modified. In the second embodiment, extended areas 32', which extend from the central area 31, have a structure in which only portions sufficient for supporting the moving comb electrodes 33, i.e., comb frameworks, remain and the other portions are removed. This structural characteristic can easily be understood by comparing this structure with the plan structure of the first embodiment shown in FIG. 2. Thus, the weight of the stage 3 is more reduced than in the first embodiment, but a driving force of the stage 3 can be maintained. As a result, driving characteristics (an increase in a scan angle with respect to the same voltage) can be more improved. However, in this embodiment, it will be unavoidable for the effective area of the stage 3, a portion in which a mirror as an optical scanner may be formed, to be reduced.

Figure 6:
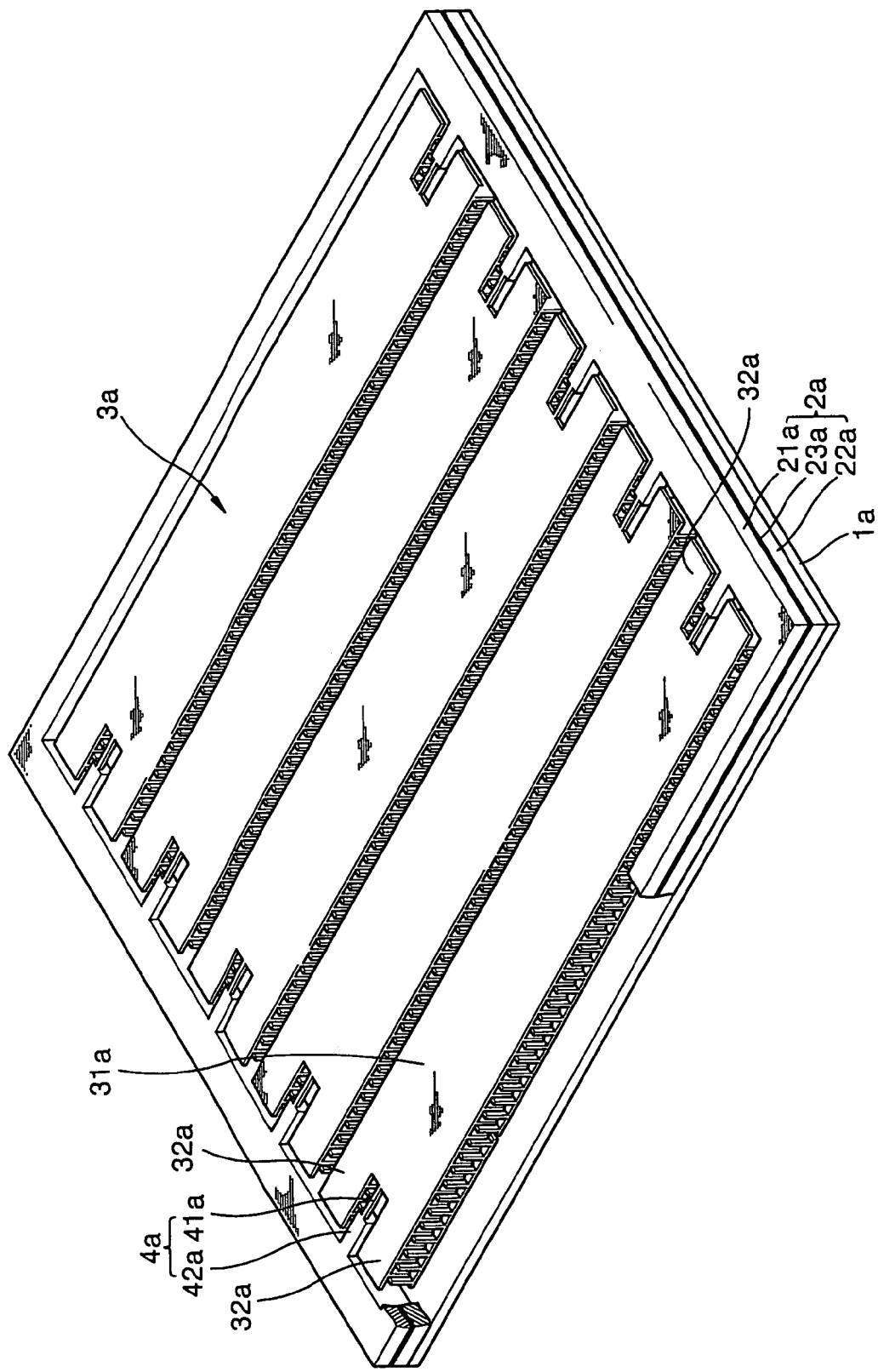
FIG. 6 is a schematic perspective view of a third embodiment of an optical scanner according to the present invention.
Figure 7:
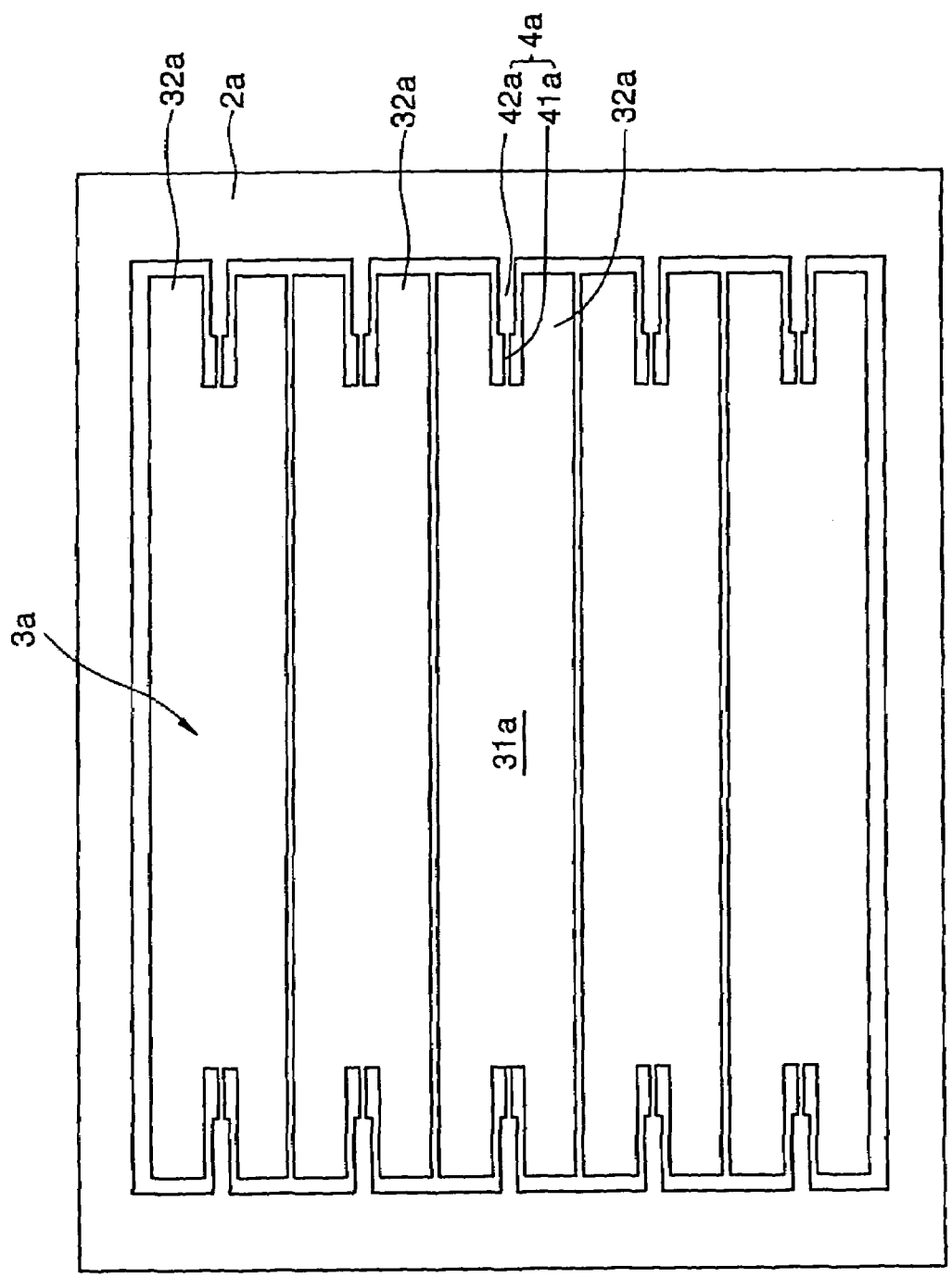
FIG. 7 is a plan view of the optical scanner shown in FIG. 6.

FIG. 6 is a schematic perspective view of an optical scanner according to a third embodiment of the present invention in which optical scanners according to the first embodiment form one array. FIG. 7 is a schematic plan view of the optical scanner according to the third embodiment of the present invention.

In the optical scanner of the third embodiment, a plurality of stages 3a are spaced apart from each other and share a frame 2a which surrounds the plurality of stages 3a. The frame 2a having a rectangular shape is formed on a substrate 1 which is made of pyrex glass, as in the previously described embodiments. The plurality of stages 3a having an H shape are arrayed inside the frame 2a. Each of the stages 3a is suspended a predetermined height from the substrate 1a by two supporters 4a. Each of the stages 3a has a central area 31a which is directly connected to the supporters 4a and extended areas 32a which extend from the central area 31, parallel to the supporters 4a by a predetermined length.

Each of the supporters 4a has a support beam 42a which extends from the frame 2a and a torsion bar 41a which extends from the support beam 42a and is connected to the central area 31a of the corresponding stage 3a. The torsion bars 41a are connected to central portions of opposite edges of the central area 31a of the corresponding stage 3a. The torsion bars 41a support the seesaw motion of the corresponding stage 3a and provides a proper elastic restoring force during the motion of the stage 3a, and the frame 2a and the supporters 4a provide an electric path to the corresponding stage 3a. The frame 2a includes a first partial frame 21a and a second partial frame 22a which are positioned on and beneath an eutectic bonding layer 23a made of an AuSn alloy, as in the previously described embodiments Moving comb electrodes and fixed comb electrodes are formed beneath each stage 3a and on the substrate 1a. Such comb electrode structures, i.e., stage driving structures, were already described in the previous embodiments, and thus their descriptions are omitted.

Figure 8:
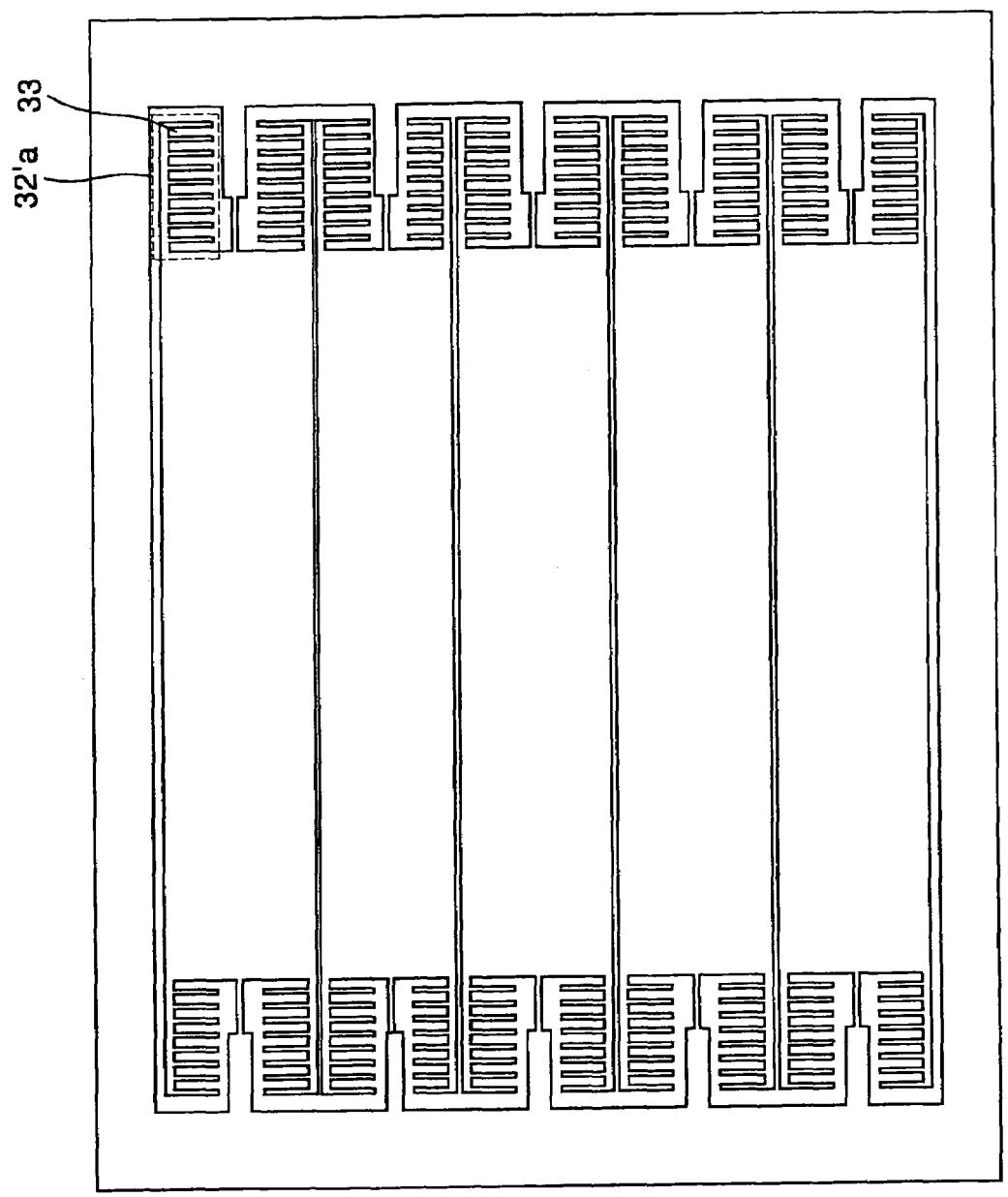
FIG. 8 is a schematic plan view of a structure of a stage in a fourth embodiment of an optical scanner according to the present invention.

FIG. 8 shows a modification of the optical scanner according to the third embodiment shown in FIGS. 6 and 7 in which the extended areas 32a are modified. In a fourth embodiment, extended areas 32a', which extend from the central area 31a, have a structure in which only portions sufficient for supporting the moving comb electrodes 33, i.e., comb frameworks, remain, but the other portions are removed. The extended areas described in the second embodiment are applied to the extended areas 32a' having this structure.

Figure 9:
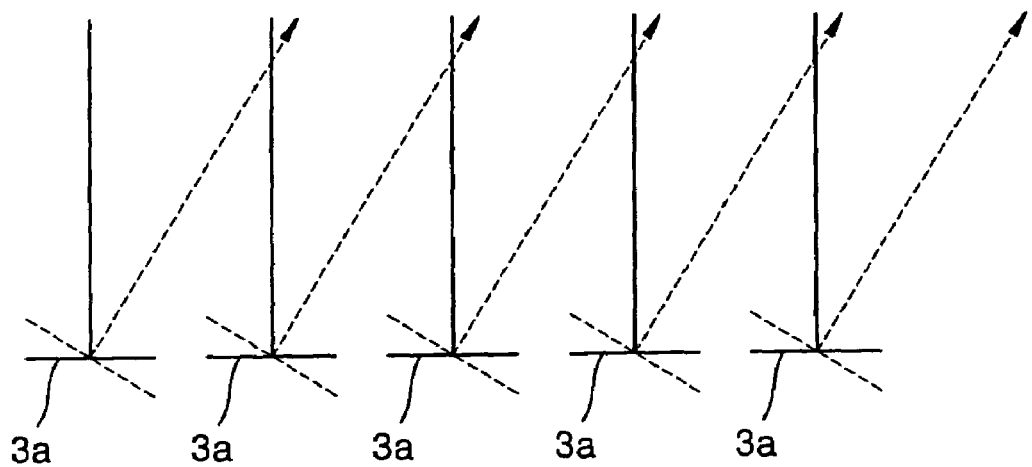
FIG. 9 is a view explaining light reflection by stage arrays in the optical scanners shown in FIGS. 6 through 8.

As shown in FIG. 9, the optical scanner according to the third and fourth embodiments radiates an incident beam onto a plurality of stages and reflects the incident beam on the plurality of stages in a structure in which the plurality of stages 3a operate at the same time. Thus, the optical scanner can reduce the whole thickness thereof, compared to a structure in which an incident beam is reflected on one stage. As a result, the weight of each of the plurality of stages can considerably be reduced, thereby greatly increasing a driving speed.

Hereinafter, each step of a preferred embodiment of a method of fabricating the optical scanner having the above-described structure according to the present invention will be described. Drawings cited along with descriptions of a fabricating process below are schematically shown for understanding, compared to the drawings for the above-described optical scanner of the present invention.

1. Method of Fabricating Upper Structure

Figure 10A:
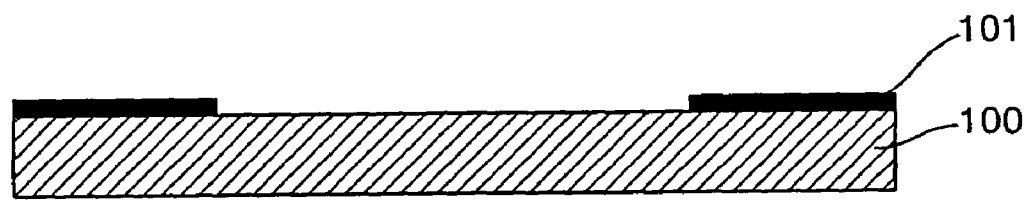
FIGS. 10A through 10I are cross-sectional views explaining a process of fabricating an upper structure in an optical scanner of the present invention.
Figure 10B:

A) As shown in FIG. 10A, a first substrate 100 is formed of a glass wafer having a manageable thickness, e.g., about 300 μm. An etching mask 101 is formed on the first substrate 100. The etching mask 101 is formed of a film which can withstand a process of etching the first substrate 100.

B) As shown in FIG, 10B, an exposed portion of the first substrate 100 which is not covered with the etching mask 101 is etched and perforated, and then the etching mask 101 is removed.

Figure 10C:
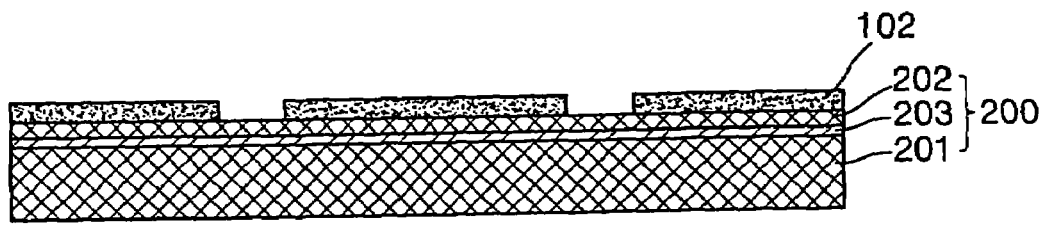

C) As shown in FIG. 10C, a silicon on insulator (SOI) wafer is formed of a stack of an oxide layer 203 that is used as an etch stopper when forming moving comb electrodes, and wafers 201 and 202. The SOI wafer is used as a second substrate 200. An etching mask 102 having openings that correspond to separated areas between a stage and a frame is formed of photoresist on the second substrate 200.

Figure 10D:
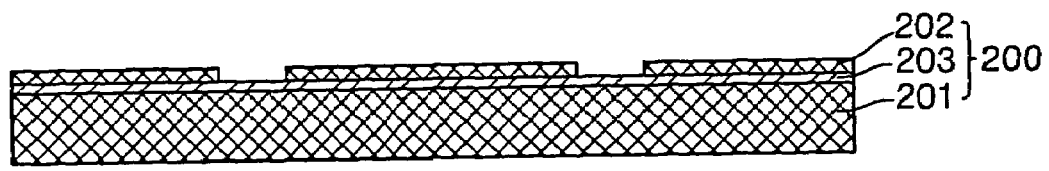

D) As shown in FIG. 10D, an exposed portion of the second substrate 200 which is not covered with the etching mask 102 is dry or wet etched, and then the etching mask 102 is removed. Here, the etching is performed only up to a portion on the oxide layer 203.

Figure 10E:
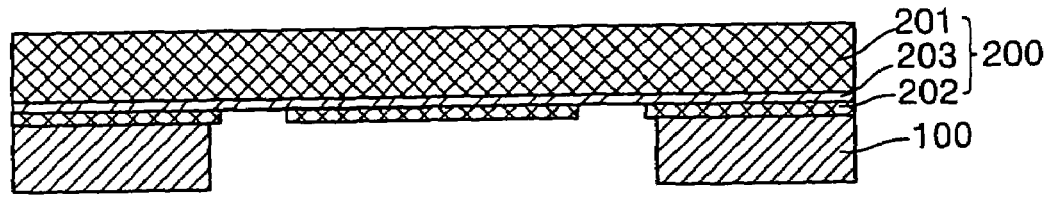

E) As shown in FIG. 10E, the first substrate 100 is bonded to the second substrate 200 using anodic bonding. The second substrate 200 is polished to a predetermined thickness, e.g., a thickness within a range of 50-100 µm, by chemical mechanical polishing (CMP).

Figure 10F:
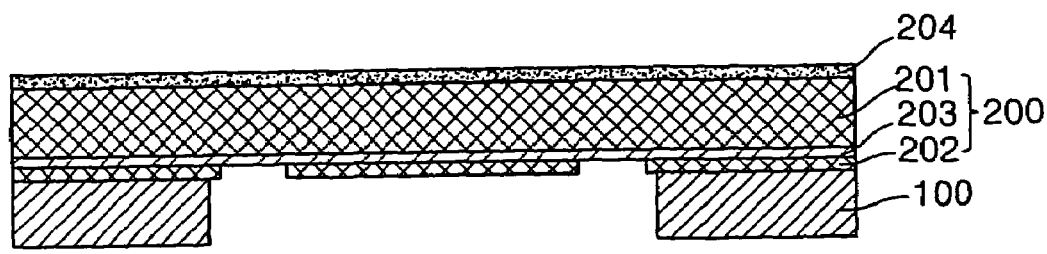

F) As shown in FIG. 10F, a metal seed layer 204 is deposited on the entire rear surface of the second substrate 200. The metal seed layer 204 is formed by depositing Cr having a thickness of about 500 Å and then Au having a thickness of about 1500-2000 Å thereon.

Figure 10G:
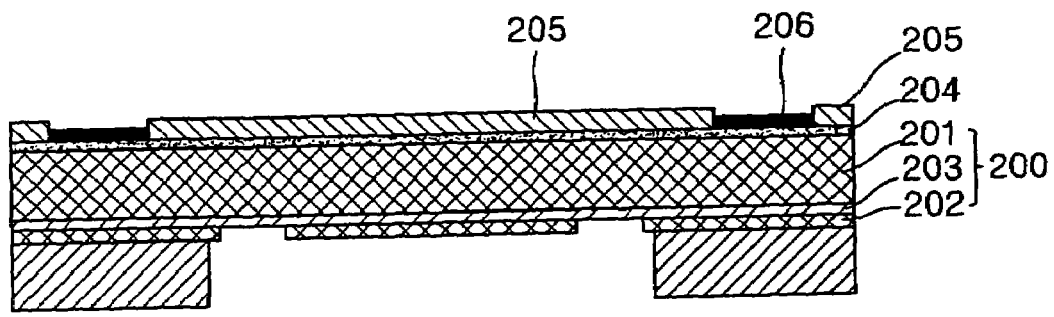

G) As shown in FIG. 10G, a plating mask 205 is formed on the metal seed layer 204. A eutectic bonding layer 206 is formed of an AuSn plating layer on an exposed portion of the metal seed layer 204 which is not covered with the plating mask 205. The plating mask 205 is formed on portions of the metal seed layer 204 except a portion of the metal seed layer 204 on which a frame will be formed. For this, the plating mask 205 is formed through a patterning process including the entirely coating of photoresist and photolithography. A eutectic bonding layer 206 formed of an AuSn plating layer having a predetermined thickness coats the exposed portion of the metal seed layer 204 which is not covered with the plating mask 205.

Figure 10H:
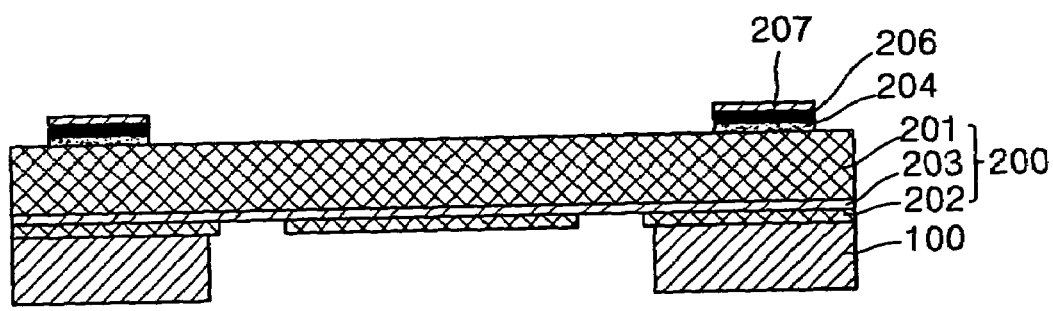

H) As shown in FIG. 10H, the plating mask 205 is removed by an etchant, an etching mask 207 is formed on the eutectic bonding layer 206, and an exposed portion of the metal seed layer 204 which is not covered with the etching mask 207 is removed. Here, the etching mask 207 is formed on the entire surfaces of the metal seed layer 204 and the eutectic bonding layer 206, i.e., the entire wafer surface, and then patterned. The patterning of the etching mask 207 may be performed by general photolithography. The exposed portion of the metal seed layer 204 which is not covered with the etching mask 207 is etched by chemical etchant.

Figure 10I:
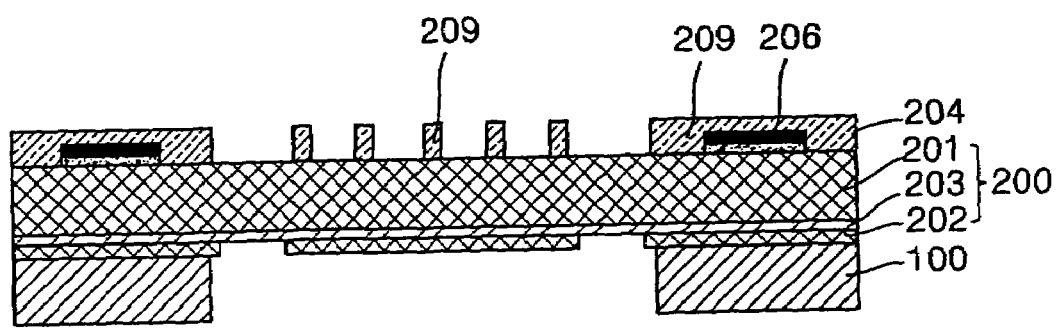

I) As shown in FIG. 10I, the etching mask 207 on the eutectic bonding layer 206 is removed and an etching mask 209 having a predetermined pattern required for the formation of moving comb electrodes is formed on the rear surface of the second substrate 200 by general photolithography.

Figure 10J:
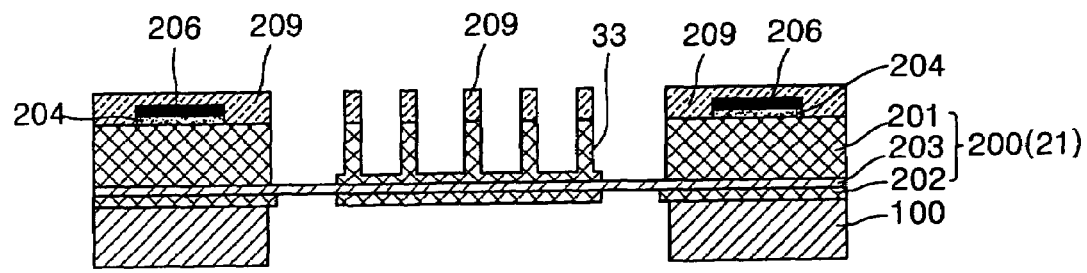

J) As shown in FIG. 10J, portions of the second substrate 200 which are not covered with the etching mask 209 are etched up to the oxide layer 203 by inductively coupled plasma reactive ion etching (ICPRIE) to form moving comb electrodes 33.

Figure 10K:
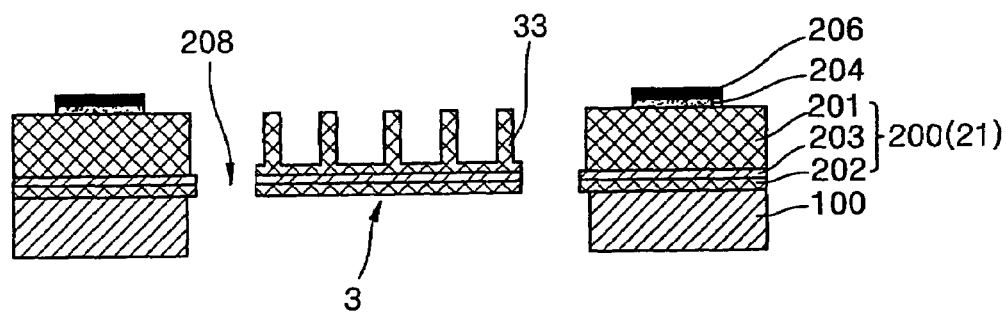

K) As shown in FIG. 10K, the etching mask 209 is removed. An exposed portion of the oxide layer 203 of the second substrate 200 is removed by Buffered Oxide Etchant (BOE) to form separated areas 208. Thus, the previously-described stage 3 is formed inside the separated areas 208, and the first partial frame 21, which surrounds the stage 3, is formed outside the separated areas 208. Here, the previously-described supporters 4, i.e., the torsion bars 41 and the support beams 42, are positioned between the stage 3 and the first partial frame 21. This resultant structure is obtained from a mask pattern in an etching process among the above processes.

Figure 10L:
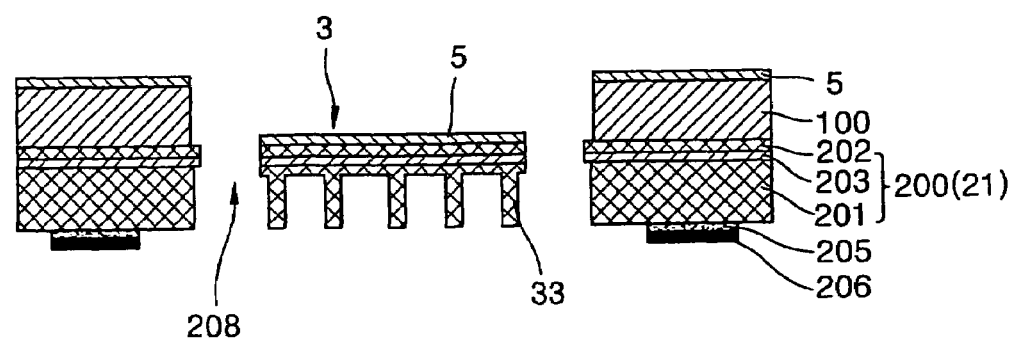

L) As shown in FIG. 10L, the device (resultant structure) which underwent the above processes is reversed, and then the upper surface of the stage 3 that is exposed inside the first substrate 100 is coated with a reflector made of Au and the like to form a mirror 5.

The above-described process has been focused on the fabrication of one device. However, the device can generally be fabricated in a wafer unit process for obtaining a plurality of devices for one wafer. Additional processes may be performed while processing devices in whole in each wafer, and dicing is necessarily performed to insulate the devices from the wafer. Since the moving comb electrodes 33 may be damaged during the dicing process, a protective layer can be formed on the moving comb electrodes to protect the moving comb electrodes before the dicing process. After the dicing is completed, the protective layer is finally removed.

2. Method of Fabricating Lower Structure

Figure 11A:
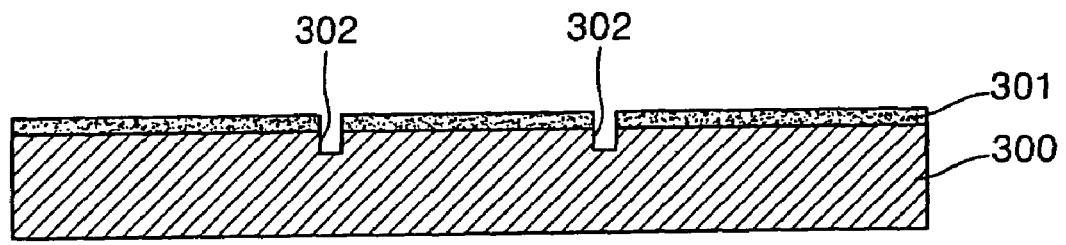
FIGS. 11A through 11I are cross-sectional views explaining a process of fabricating a lower structure of the optical scanner of the present invention.

A) As shown in FIG. 11A, a third base substrate 300 is used as the substrate 1 of the optical scanner of the present invention, which is formed of pyrex glass. An etching mask 301 is formed of photoresist on the third base substrate 300. An exposed portion of the third base substrate 300 which is not covered with the etching mask 301 is etched to a predetermined depth to form a groove 302. The groove 302 is filled with an interconnection layer that is formed on the third base substrate 300, i.e., the substrate 1 of the optical scanner. The groove 32 is formed by dry etching such as reactive ion etching (RIE).

Figure 11B:
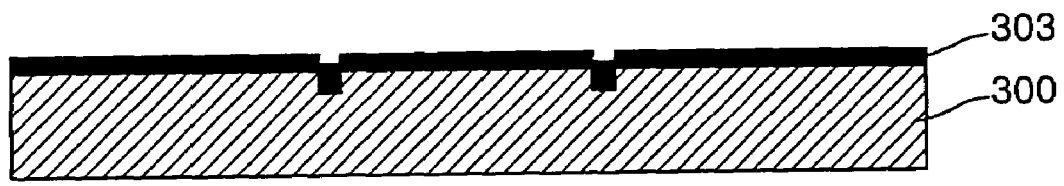

B) As shown in FIG. 11B, the etching mask 301 is removed. A metal layer 303 for the interconnection layer is deposited on the entire upper surface of the third base substrate 300. The metal layer 303 is connected to fixed comb electrodes in the optical scanner of the present invention and is preferably formed of Au since the metal layer 303 is used for bonding to an Au electric wire. The thickness of the metal layer 303 is thicker than the depth of the groove 302 so that the metal layer 303 is electrically completely connected to the fixed comb electrodes during anodic bonding.

Figure 11C:
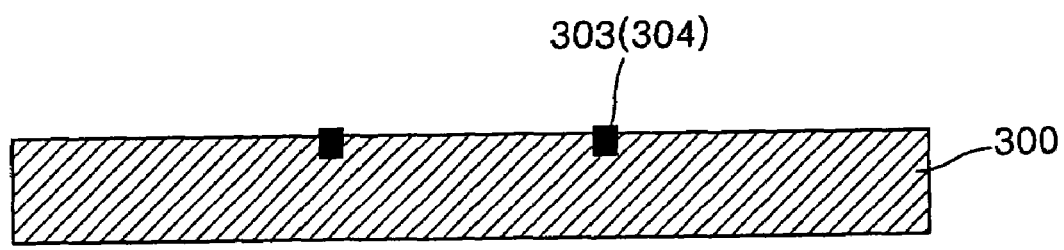

C) As shown in FIG. 11C, the other portion of the metal layer 303 except a portion in the groove 302 is removed to form an interconnection layer 304. Here, dry or wet etching, preferably, wet etching using a mask is performed.

Figure 11D:
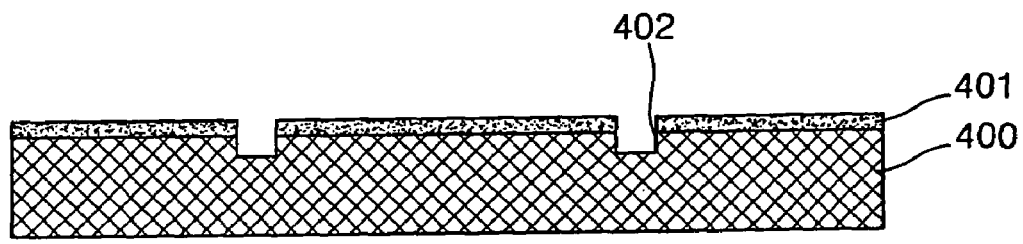

D) As shown in FIG. 11D, a fourth substrate 400 is formed of a silicon wafer. An etching mask 401 having patterns corresponding to the previously-described separated areas between a base of the stationary electrodes and the second partial frame is formed on the fourth substrate 400. The fourth substrate 400 is etched by RIE to form separated grooves 402. Here, the separated grooves 402 insulate the fixed comb electrode on the fourth substrate 400 from each other and define electrodes and the frame to separate them.

Figure 11E:
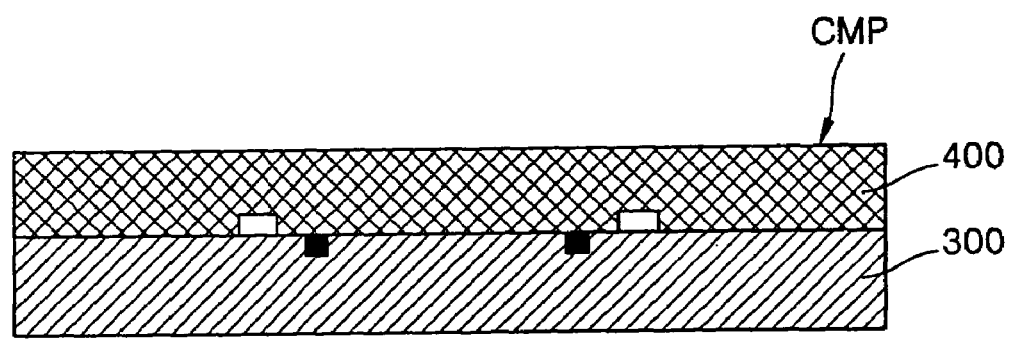

E) As shown in FIG. 11E, the etching mask 401 is removed from the fourth substrate 400. Anodic bonding is performed to bond the fourth substrate 400 to the third substrate 300. The fourth substrate 400, i.e., silicon wafer, is polished to a thickness of 50-100 µm by chemical mechanical polishing (CMP) based on drive specification of a desired optical scanner.

Figure 11F:
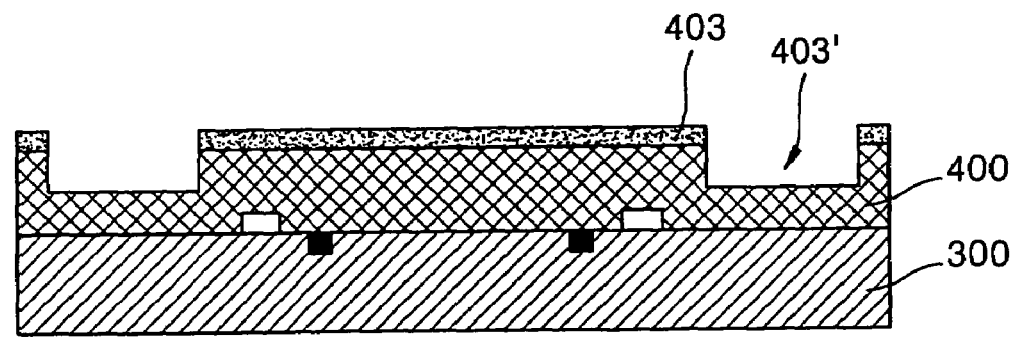

F) As shown in FIG. 11F, an etching mask 403 having an opening 403' with a smaller width than the second partial frame 22 and corresponding to the second partial frame 22 is formed on the fourth substrate 400 that is treated by CMP. An exposed portion of the fourth substrate 400 is etched to a predetermined depth. Here, a generally known align key is inserted for bonding to the upper structure. Since the etching depth is a function of a crossing area of the moving comb electrodes and fixed comb electrodes, the etching depth must properly be controlled for design of the crossing area.

Figure 11G:
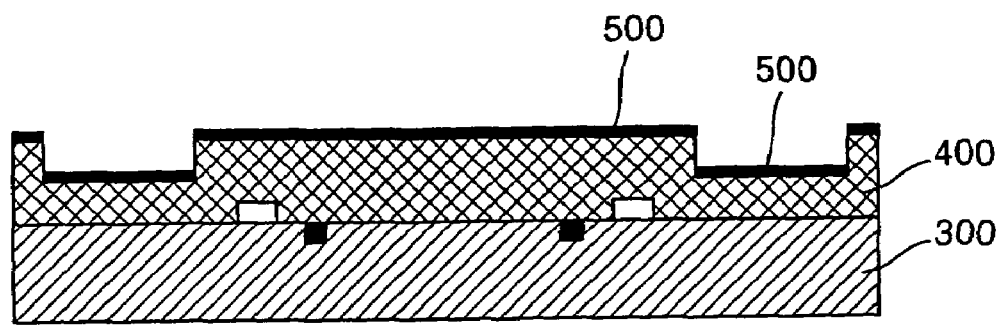

G) As shown in FIG. 11G, the etching mask 403 on the fourth substrate 400 is removed. A metal layer 500 is deposited on the entire surface of the fourth substrate 400. Here, it is preferable that the metal layer 500 is formed of the same material as the metal seed layer 204. After this step, step H or I is performed.

Figure 11H:
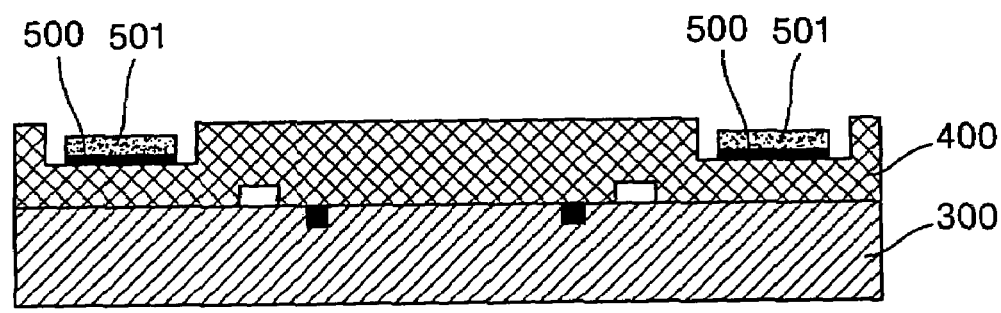

H) As shown in FIG. 11H, an etching mask 501 is formed only on a portion of the metal layer 500 corresponding to the second partial frame 22. After an exposed portion of the metal layer 500 which is not covered with the etching mask 501 is removed, step J is performed.

Figure 11I:
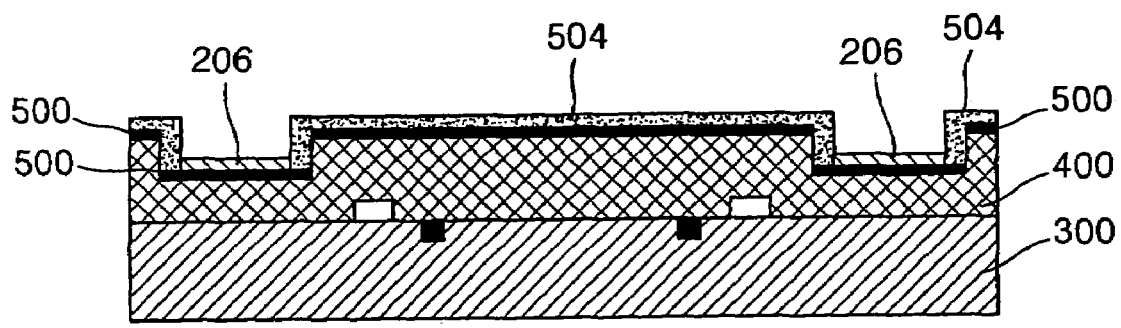

I) As shown in FIG. 11I, instead of the upper structure, the lower structure may be coated with a eutectic bonding layer for bonding the upper and lower structures. Here, a plating mask 504 is formed of photoresist on the metal layer 500 and is formed and a eutectic bonding layer 206 is formed on the metal layer 500. The plating mask 504 is removed, and then an exposed portion of the metal layer 500 is removed using step (H).

Figure 11J:
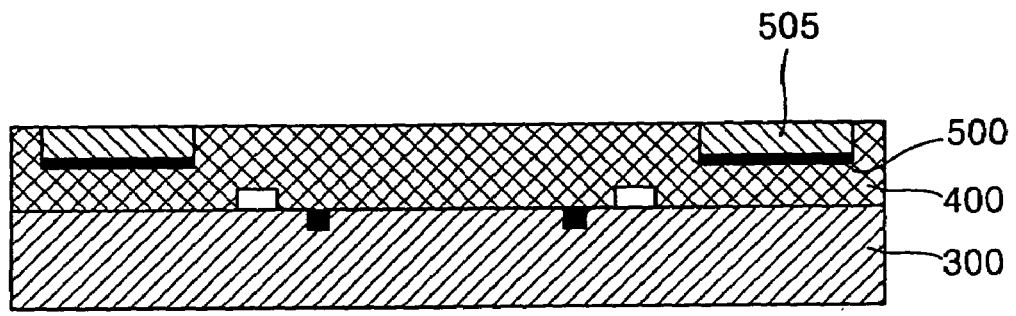

J) As shown in FIG. 11J, a sacrificial layer 505 for filling a frame is coated to smoothly form a pattern of the fixed comb electrodes, and a planarizing process is performed by polishing.

Figure 11K:
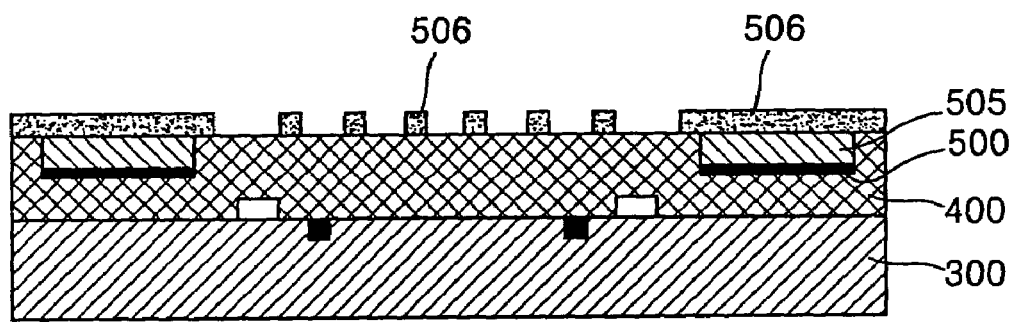

K) As shown in FIG. 11K, an etching mask 506 is formed on portions corresponding to the fixed comb electrodes and the frame on the fourth substrate 400, and then patterned.

Figure 11L:
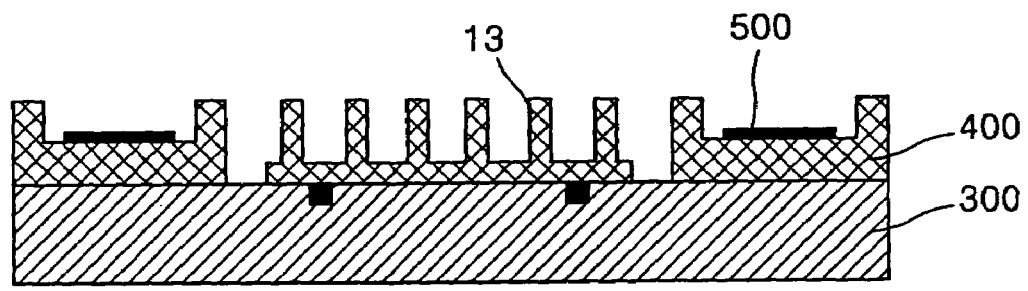

L) As shown in FIG. 11L, an exposed portion of the fourth substrate 400 which is not covered with the etching mask 506 is etched to a predetermined depth by inductively couDled plasma reactive-ion etching (ICPRIE). The comb electrodes are electrically insulated from the second partial frame.

After the above processes, a protective layer is formed of photoresist on the entire structure of the fourth substrate 400 and diced to be divided into unit lower structures. After the dicing, the sacrificial layer, the protective layer, and the etching mask are removed by chemical etchant, and then cleaning and drying are performed.

3. Combination of Upper and Lower Structures

This step is to combine the unit upper and lower structures obtained from the above-described processes to complete an optical scanner.

Figure 12:
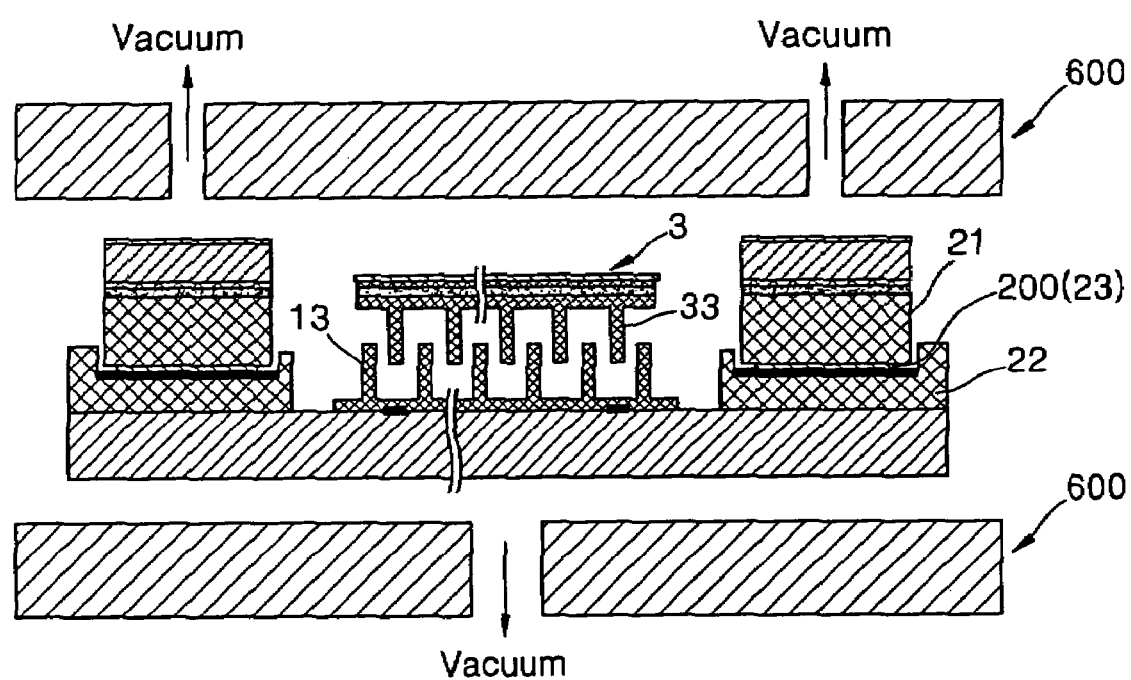
FIG. 12 is a cross-sectional view explaining a method of combining the upper structure with the lower structure in a method of fabricating the optical scanner of the present invention.

FIG. 12 shows that the upper and lower structures are arrayed and then combined into one. Vacuum chucks 600 assist the array and combination of the upper and lower structures. Separated upper and lower structures are bonded using a flip chip bonder. The upper and lower structures are fixed to the two vacuum chucks 600 (both frames of the upper structure are fixed to one vacuum chuck and the center of the lower structure is fixed to the other vacuum chuck), arrayed with observation through a microscope, and combined into one by making the two vacuum chucks 600 closer. Here, by maintaining predetermined pressure and eutectic temperature, a metal eutectic bonding layer between frames is melted and stuck. As a result, the upper and lower structures are combined into one.

As described above, in an optical scanner of the present invention, it is easy to increase the number of comb electrodes. Thus, a driving speed that is almost equal to that of an optical scanner in which comb electrodes are formed only beneath a rectangular stage can be obtained and a driving voltage can considerably be reduced. Also, the mass of a mirror can be reduced by dividing the mirror into a plurality of mirrors, which enables high-speed scanning.

Further, a method of fabricating an optical scanner according to the present invention can succeed in the fabrication of a desired optical scanner and enable the stable fabrication of devices. Thus, yield of products can be increased.

What is claimed is:

1. A method of fabricating an optical scanner comprising:
    forming an upper structure which has a rectangular first partial frame that includes an H-shaped stage having a central area supported by supporters that include support beams that are positioned inside separated areas of the first partial frame and extend from the first frame, and torsion bars that extend from the support beams and are directly connected to the central areas, wherein the H-shaped stage includes extended areas that extend from the central area along a substantial length of the supporters and are parallel to the supporters;
    forming a lower structure that is spaced apart from the stage, the lower structure having a second partial frame opposite to the first partial frame and a substrate that supports the second partial frame; and
    bonding the first partial frame to the second partial frame by eutectic bonding to combine the upper and lower structures into one structure.

2. The method of claim 1, wherein a bonding layer for the eutectic bonding is formed on one of the first and second partial frames in one of steps of forming the upper and lower structures.

3. The method of claim 1, wherein vertical moving comb electrodes are formed beneath the stage in the step of forming the upper structure.

4. The method of claim 3, wherein fixed comb electrode that are opposite to the moving comb electrodes beneath the stage are formed on the substrate in the step of forming the lower structure.

5. The method of claim 1, wherein the step of forming the upper structure comprises:
    forming a hole larger than the stage in a first substrate;
    etching portions corresponding to the separated areas to predetermined width and depth on a second substrate;
    anodic-bonding the first and second substrates;
    polishing the second substrate to a predetermined thickness;
    forming an upper metal layer on a portion corresponding to the first partial frame beneath the second substrate; and
    etching a lower surface of the second substrate to a predetermined pattern to perforate the portions corresponding to the separated areas and forming the moving comb electrodes having a predetermined height beneath the stage.

6. The method of claim 1, wherein the step of forming the lower structure comprises:
    forming an interconnection layer having a predetermined pattern on a third substrate which supports the lower structure;
    forming lower separated areas having predetermined width and depth between the second partial frame and the fixed comb electrodes beneath the fourth substrate;
    anodic-bonding the third and fourth substrates;
    etching a portion corresponding to the second partial frame to a predetermined depth on the fourth substrate;
    forming a lower metal layer in the etched portion of the fourth substrate;
    forming a mask layer which covers a portion corresponding to the second partial frame and the fixed comb electrodes and exposes separated areas between the second partial frame and the fixed comb electrode; and
    etching a portion that is not covered with the mask layer to a predetermined depth to perforate the lower separated areas and forming fixed comb electrodes having a predetermined height inside the lower separated areas.

7. The method of claim 5, wherein the step of forming the upper metal layer comprises:
    forming a metal seed layer beneath the first partial frame; and
    coating the metal seed layer with a eutectic bonding layer.

* * * * *